April 23, 1940.　　　　　　　H. D. ADAMS　　　　　　2,198,238
VALVE SEAT
Filed Nov. 3, 1937
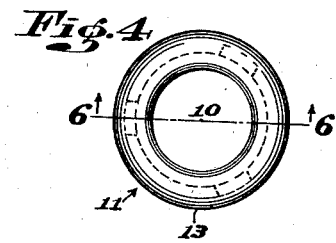
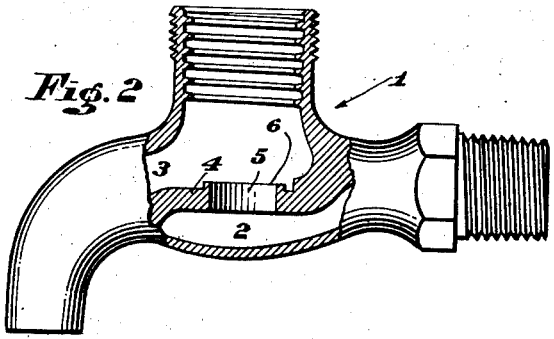
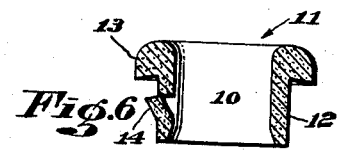
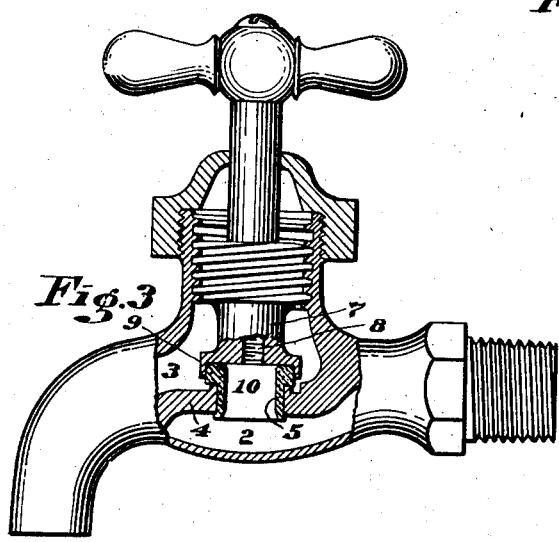
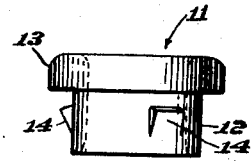
INVENTOR
Harry D. Adams
BY John E. R. Hayn
ATTORNEY Patented Apr. 23, 1940

2,198,238

UNITED STATES PATENT OFFICE 2,198,238

VALVE SEAT

Harry D. Adams, Boston, Mass., assignor, by mesne assignments, to Hadley-Hubbard Company, Boston, Mass., a corporation of Massachusetts Application November 3, 1937, Serial No. 172,555

5 Claims. (Cl. 251—167)

The invention relates to an improvement in valve seats for valves in which inlet and outlet passages through the valve are separated by a partition or diaphragm having in it a port or opening which is controlled by a valve that has engagement with the diaphragm around the opening in it forming a valve seat. The invention, however, is only applicable to valves which control the passage of a fluid that will produce moisture within the valve chamber. The invention is especially applicable to the common type of water faucet.

Among the objects of the invention is to provide a valve seat by which a complete closure of the valve may be obtained without tendency to drip, and this especially in connection with valves that have been used and which require the application of new parts for obtaining a tight closure.

A further object of the invention is to provide a valve seat which can be conveniently applied to the valve by one unskilled, and which will require no special tool.

The invention is illustrated in the light of its application to an ordinary water faucet. The common practice with these faucets is to provide the head of the valve with a washer such as leather, rubber, or some non-metallic composition which will contact the valve seat when the valve is closed and make a tight joint. These washers are usually held in place by a screw threaded into the head of the valve. To remove the washer the screw must be removed, and quite often it will be found that the screw has become so corroded that it cannot be removed without breaking it off, necessitating reboring the screw socket before a new washer can be applied.

The present invention is especially applicable to just this kind of a valve or faucet when the washer on the head of the valve is removed and it makes no difference whether or not the screw which held the washer has been broken. If broken the broken end may be left in the head. In other words, dependence is made not upon a washer borne by the head but upon a seat for the valve with which the metal head of the valve may have contact to make a tight joint when the valve is closed. The invention, however, can best be seen and understood by reference to the drawings in which embodiment thereof is shown as applied to a conventional water faucet.

Fig. 1 is a cross section of a valve seating device embodying the invention.

Fig. 2 is a view mainly in section of the faucet to which the valve seating device shown in Fig. 1 is applied.

Fig. 3 is a view mainly in cross section of the faucet with the valve seating device shown in Fig. 1 applied, and with the valve closed.

Fig. 4 is an enlarged top plan of the valve seating device as shown in Fig. 1 with certain additional features, to which attention will later be directed.

Fig. 5 is a front elevation of the valve seating device shown in Fig. 4; and

Fig. 6 is a section on the line 6—6 of Fig. 4.

Referring to the drawing—1 represents a faucet having an inlet passage 2, an outlet passage 3, a partition or diaphragm 4 separating these passages and having in it a port or opening 5, and 6 a valve seat on the diaphragm around the port in it with which the head of the valve, or washer, commonly employed borne by the head, has engagement. 7 is the stem of the valve which is operated in the usual manner. 8 is the head of the valve. This head as shown is commonly provided with a projecting flange or rim 9 forming a socket in which the washer, not shown, is usually contained and which is held by a screw, not shown, which fits within a threaded boring or socket 10 formed in the head. The washer and screw are not shown for the reason that they are dispensed with in the present assembly, and instead, the valve seating device 11 as shown in Fig. 1 is applied to the diaphragm or partition 4.

The valve seating device 11 has a generally tubular body or ferrule 12 with a laterally projecting annular flange forming a head or bead 13, the outer edge of which is preferably rounded and undercut as shown in Fig. 6. The device is non-metallic but is made of some tough wear resisting material which will withstand a high pressure and which will be more or less compressible when subjected to such pressure, and more especially of a material which will appreciably expand when subjected to the influence of water or moisture. The best material thus far found is a high grade vulcanized fibre made from textile fabric material. The vulcanized fibre is made in tubular form, and the valve seating devices then lathe cut from the tube.

The valve seating device 11 is applied to the valve or faucet by inserting the body 12 of the device into and through the port or opening 5 in the partition with the head 13 of the device brought to bear against what was formerly the valve seat 6, the annular head 13 then forming a valve seat. The device 11 is made in different sizes and a size is chosen in which the body 12 of the device will easily be made to enter the opening in the partition with an easy fit therein. The valve is then closed with the head 8 of the valve brought down to bear against the head 13 of the device. When water or other liquid developing moisture is passed through the valve the device 11 will expand. Its head 13 will expand against the partition in that part which was formerly its valve seat 6 and will make a tight joint therewith irrespective of any irregularity or cut in this seat. The joint is further obtained by the body 12 of the device being made to hug and interlock with the wall surrounding the port or opening 5 in the partition and clench beneath the partition at the bottom of the opening for the body 12 of the device is made sufficiently long for this effect to be obtained. The head 13 of the device held securely in place by the body 12 will also expand against the head of the valve thereby forming a valve seat precisely conformable to the bearing surface of the valve head and making an exact seating for the valve, requiring only a slight turning of the valve to obtain a complete shutoff. The expansion of the device 11 when subjected to the influence of water or moisture is quite pronounced.

In applying the valve seating device 11 to a water faucet already installed it is of course necessary to shut off the water. The faucet is then taken apart and the old washer and screw removed. If the screw is broken off it is left undisturbed. The largest size valve seating device whose body will enter the hole or opening in the partition is then chosen. This is then pushed in, the faucet assembled, and the valve closed in the usual manner. The water is then turned on. There may be a small drip or leak for a short while but within a comparatively short time all drip will cease for the device has expanded to form a tight closure as above described.

Under some circumstances where the water is not completely shut off there might be some difficulty in placing the device in the faucet and holding it there until the valve can be closed. For this reason it is preferred that the body 12 of the device be provided with outstanding ears 14 cut from the body which will permit of the body of the device being pushed into the opening in the partition, but will prevent its being expelled by any water as might flow from a leaky shutoff valve. When the device expands the outstanding ears will merge into its body and be homogeneous therewith.

The vulcanized fibre preferably employed in the making of the valve seats is a fibre made from a good grade cotton rag paper which in the ordinary process of vulcanization is treated to a bath of chloride of zinc and rolled into a tube. It is from this tube that the valve seats are cut across the grain of the tubing. Valve seats thus prepared from this vulcanized fibre possess a relatively high degree of expansion and especially uniform expansion in a lateral direction.

I claim:

1. In combination with a faucet having a ported partition, a replaceable valve seat comprising a beaded ferrule positioned in the port in said partition and extending below the same, said bead seating on the upper surface of said partition, and the lower end of said valve seat expanded radially to engage the lower surface of said partition, said ferrule being made of material capable of swelling upon absorption of water.

2. In combination with a faucet having a ported partition, a replaceable valve seat of fibrous material comprising a beaded ferrule positioned in the port in said partition and extending below the same, said bead seating on the upper surface of said partition, and the lower end of said valve seat expanded radially to engage the lower surface of said partition, said ferrule being made of material capable of swelling upon absorption of water.

3. In combination with a faucet having a ported partition with a port controlled by a valve, a replaceable valve seat comprising a headed ferrule, the head of which ferrule is seated upon the upper surface of said partition around said port and against which head said valve has bearing when closed; and the body of which ferrule is positioned within said port and expansible radially to engage said partition; said body of the ferrule being made of material capable of radial expansion through swelling by absorption of water whereby said head is held in position and a water tight joint is provided between said ferrule and said partition.

4. In combination with a faucet having a ported partition with a port controlled by a valve, a replaceable valve seat comprising a headed ferrule, the head of which ferrule lies seated upon the upper surface of said partition around said port and is expansible against said valve when closed; and the body of which ferrule lies positioned within said port and is expansible against said partition; said ferrule being made of material capable of expansion through swelling by absorption of water whereby said head thereof is made to conform to the engaging surface of said valve and a water tight joint is provided between said body of the ferrule and said partition.

5. In combination with a faucet having a ported partition with a port controlled by a valve, a replaceable valve seat comprising a headed ferrule, the head of which ferrule lies seated upon the upper surface of said partition around said port and is expansible against said valve when closed; and the body of which ferrule lies positioned within said port and is expansible against said partition; said ferrule being made of vulcanized fibre capable of expansion through swelling by absorption of water whereby said head thereof is made to conform to the engaging surface of said valve and a water tight joint is provided between said body of the ferrule and said partition.

HARRY D. ADAMS.